US012175959B1

(12) United States Patent
Xu et al.

(10) Patent No.: US 12,175,959 B1
(45) Date of Patent: *Dec. 24, 2024

(54) JOINT AUDIO DE-NOISE AND DE-REVERBERATION FOR VIDEOCONFERENCING

(71) Applicant: Zoom Video Communications, Inc., San Jose, CA (US)

(72) Inventors: Xiuyu Xu, Hangzhou (CN); Jianfang Zhai, Hangzhou (CN)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,465

(22) Filed: Sep. 11, 2023

Related U.S. Application Data

(63) Continuation of application No. 17/511,654, filed on Oct. 27, 2021, now Pat. No. 11,790,880.

(51) Int. Cl.
| | | |
|---|---|---|
| *H04B 3/20* | (2006.01) | |
| *G06N 3/04* | (2023.01) | |
| *G10K 11/16* | (2006.01) | |
| *H04L 65/403* | (2022.01) | |

(52) U.S. Cl.
CPC .............. *G10K 11/16* (2013.01); *G06N 3/04* (2013.01); *H04L 65/403* (2013.01)

(58) Field of Classification Search
CPC ......... G10K 11/16; G06N 3/04; H04L 65/403
USPC .............. 381/66, 92, 93; 379/406.01, 406.06
See application file for complete search history.

(56) References Cited

U.S. PATENT DOCUMENTS

| | | | | |
|---|---|---|---|---|
| 9,813,811 | B1* | 11/2017 | Sun | G10L 21/0272 |
| 9,928,847 | B1* | 3/2018 | Cleve | H04M 3/002 |
| 10,573,301 | B2* | 2/2020 | Kupryjanow | G10L 21/0232 |
| 10,769,528 | B1 | 9/2020 | Wang et al. | |
| 11,158,304 | B2* | 10/2021 | Chen | G10L 15/16 |
| 2011/0110526 | A1* | 5/2011 | Ishibashi | H04R 3/02 |
| | | | | 381/66 |
| 2021/0174812 | A1* | 6/2021 | Gao | G10L 15/22 |

(Continued)

OTHER PUBLICATIONS

U.S. Appl. No. 17/511,654, "Notice of Allowance", dated Jun. 14, 2023, 12 pages.

(Continued)

*Primary Examiner* — William J Deane, Jr.
(74) *Attorney, Agent, or Firm* — Kilpatrick Townsend & Stockton LLP

(57) ABSTRACT

One disclosed example method includes a device receiving an audio signal recorded in a physical environment and applying a de-noise and de-reverberation model onto the audio signal to generate a cleaned audio signal. The de-noise and de-reverberation model is configured to remove noise and reverberation from the audio signal and is trained via a training process. The training process includes training the de-noise and de-reverberation model based on a trained de-noise teacher model and a trained de-reverberation teacher model. The training includes adjusting a portion of parameters of the de-noise and de-reverberation model based on values generated by the de-noise teacher model and the de-reverberation teacher model and then adjusting the parameters of the de-noise and de-reverberation model independently of the de-noise teacher model and the de-reverberation teacher model.

19 Claims, 8 Drawing Sheets

(56) References Cited

U.S. PATENT DOCUMENTS

| | | | | |
|---|---|---|---|---|
| 2021/0250722 A1* | 8/2021 | Giurda | .................. | H04R 3/005 |
| 2021/0287661 A1* | 9/2021 | Sharma | ................ | G10L 13/033 |
| 2023/0066600 A1 | 3/2023 | Sha et al. | | |
| 2023/0129322 A1* | 4/2023 | Sha | ....................... | H04R 3/005 |

OTHER PUBLICATIONS

Ernst, et al., "Speech Dereverberation Using Fully Convolutional Networks", 2018 26th European Signal Processing Conference (EU SIPCO). IEEE, Available Online at: https://arxiv.org/pdf/1803.08243.pdf, Apr. 3, 2019, 5 pages.

Gou, et al., "Knowledge Distillation: A Survey", International Journal of Computer Vision 129.6 (2021), Available Online at: https://arxiv.org/pdf/2006.05525.pdf, May 20, 2021, 36 pages.

Hinton, et al., "Distilling the Knowledge in a Neural Network", Available Online at: https://arxiv.org/abs/1503.02531, Mar. 9, 2015, 9 pages.

Liu, et al., "Improving Multi-Task Deep Neural Networks via Knowledge Distillation for Natural Language Understanding", Available Online at: https://arxiv.org/pdf/1904.09482.pdf, Apr. 20, 2019, 8 pages.

Liu, et al., "Multi-Task Deep Neural Networks for Natural Language Understanding", Available Online at: https://arxiv.org/pdf/1901.11504.pdf, May 30, 2019, 10 pages.

Romero, et al., "FitNets: Hints for Thin Deep Nets", Available Online at: https://arxiv.org/pdf/1412.6550.pdf, Mar. 27, 2015, 13 pages.

* cited by examiner

JOINT AUDIO DE-NOISE AND DE-REVERBERATION FOR VIDEOCONFERENCING

CROSS-REFERENCE

This application is a continuation of U.S. patent application Ser. No. 17/511,654, filed Oct. 27, 2021, titled "Joint Audio De-Noise And De-Reverberation For Videoconferencing," the entirety of which is incorporated herein by reference.

FIELD

The present application generally relates to videoconferences and more particularly relates to systems and methods for joint de-noise and de-reverberation of audio signals for videoconferences.

BRIEF DESCRIPTION OF THE DRAWINGS

The accompanying drawings, which are incorporated into and constitute a part of this specification, illustrate one or more certain examples and, together with the description of the example, serve to explain the principles and implementations of certain examples.

DETAILED DESCRIPTION OF THE DRAWINGS

Figure 1:
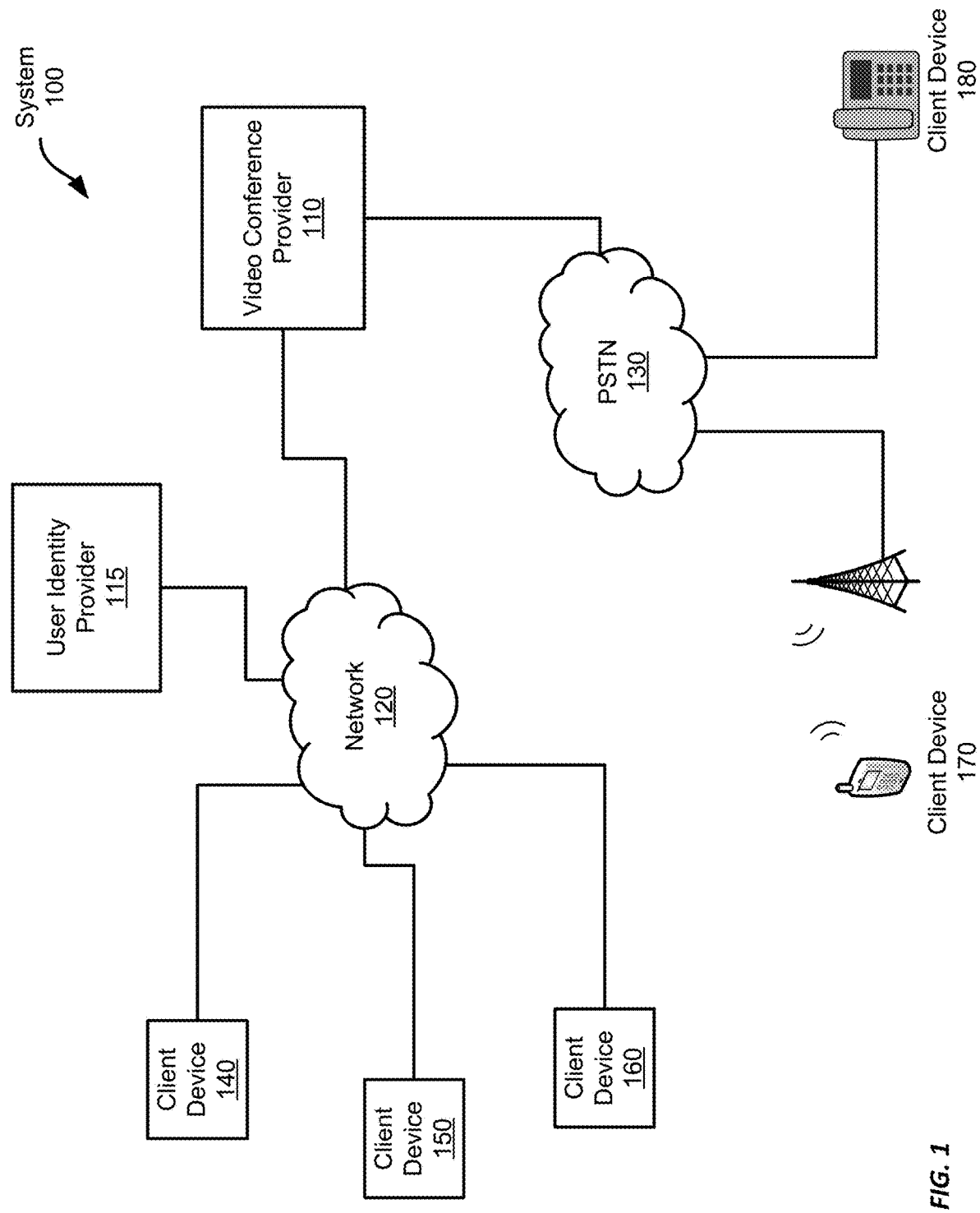
FIG. 1 shows an example system that provides videoconferencing functionality to various client devices, according to certain aspects described herein.

Examples are described herein in the context of systems and methods for joint de-noise and de-reverberation of audio signals in videoconferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing systems enable their users to create and attend videoconferences (or "meetings") via various types of client devices. After joining a meeting, the participants receive audio and video streams or feeds (or "multimedia" streams or feeds) from the other participants and are presented with views of the video feeds from one or more of the other participants and audio from the audio feeds. Using these different modalities, the participants can see and hear each other, engage more deeply, and generally have a richer experience despite not being physically in the same space.

However, when audio signals are captured at respective client devices, different distortions may be introduced. One distortion is the noise that is captured along with the audio signal, which may be the background noise of the environment where the device is located, noise generated by inadvertent actions taken by the participant near the audio recording device, or a defect of the audio recording device. Another distortion is the reverberation effect of the audio signal captured by the audio recording device. Reverberation is the persistence of sound after the sound is produced. A reverberation is created when a sound or signal is reflected causing numerous reflections to build up and then decay as the sound is absorbed by the surfaces of objects in the space-which could include furniture, people, and air. These distortions prevent the captured audio from being heard clearly by other participants of the meeting.

To provide high-quality audio signals, a videoconferencing system according to this disclosure applies a de-noise and de-reverberation model to the captured audio signal to simultaneously remove the noise and reverberation from the captured audio signal. In one example, a client device captures the sound in the environment where the client device is located. The client device further feeds the audio signal of the captured sound to a de-noise and de-reverberation model that is configured to simultaneously remove the noise and reverberation from the input audio signal. The output of the de-noise and de-reverberation model is a cleaned audio signal. The client device can send the cleaned audio signal along with other data associated with the meeting to other participants. In some examples, the client device may use the cleaned audio signal for other purposes, such as performing post-processing (e.g., speech recognition) on the cleaned audio signal.

The de-noise and de-reverberation model can be obtained via guided training using two auxiliary models, also referred to herein as "teacher models." One teacher model is configured to remove noise from input audio signals ("de-noise teacher model") and the other teacher model is configured to remove reverberation from input audio signals ("de-reverberation teacher model"). Compared with the two teacher models, the de-noise and de-reverberation model has a less complicated structure and thus requires fewer computations to operate. For example, if the de-noise and de-reverberation model and the two teacher models are neural network models, the de-noise and de-reverberation model can be configured with fewer layers and fewer nodes than each of the teacher models.

To train the de-noise and de-reverberation model, a model training system can train the two teacher models first. A training dataset is generated for each of the teacher models. For example, for the de-noise teacher model, a training dataset containing noisy audio signals can be generated. The noisy audio signals can be generated by adding noises of different types with different strengths to clean audio signals. For the de-reverberation teacher model, a training dataset containing reverberated samples or audio signals can be generated. The reverberated samples or audio signals can be generated by adding reverberations of different types with different strengths to clean audio signals. The de-noise teacher model and the de-reverberation teacher model can be fully trained using the respective training datasets.

The training of the de-noise and de-reverberation model includes two stages. In the first stage, values generated by the de-noise teacher model and de-reverberation teacher model are utilized to guide the training of a portion of the parameters of the de-noise and de-reverberation model. In the example where the models are neural network models, the model training system can retrieve the output values of a hidden layer (e.g., the last hidden layer) from each of the two teacher models. The model training system can further adjust the parameters of the de-noise and de-reverberation model in the input layer and the hidden layers to minimize a loss function defined based on the hidden layer output values of the two teacher models.

The second stage of the training is performed independently of the two teacher models. In this stage, the parameters of the entire de-noise and de-reverberation model are adjusted or updated to minimize a loss function defined based on the similarity between the cleaned audio signals by the model and the ground truth clean audio signal in the training dataset for the de-noise and de-reverberation model. The trained de-noise and de-reverberation model can be provided to client devices of the videoconferencing system to simultaneously remove noise and reverberation from the recorded audio signals as described above.

The techniques disclosed herein for joint de-noise and de-reverberation of audio signals in videoconferences improve the audio quality of the videoconferencing. By removing the noise and reverberation from the audio signals recorded at individual client devices, high-quality audio signals can be delivered to other participants of the meeting. Further, compared with approaches where the noise and reverberation are removed in separate steps using separate models, the joint removal of noise and reverberation using one model can significantly reduce the computational complexity of the audio cleaning process and the memory space used to store the model. Yet, the audio quality of the cleaned audio signals is maintained high because of the guided training from the more complex teacher models. As a result, the de-noise and de-reverberation model can have similar audio quality in the cleaned audio signal as the two teacher models but with a much lower computational complexity and less complicated model structure.

This illustrative example is given to introduce the reader to the general subject matter discussed herein and the disclosure is not limited to this example. The following sections describe various additional non-limiting examples and examples of systems and methods for joint de-noise and de-reverberation of audio signals for videoconferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
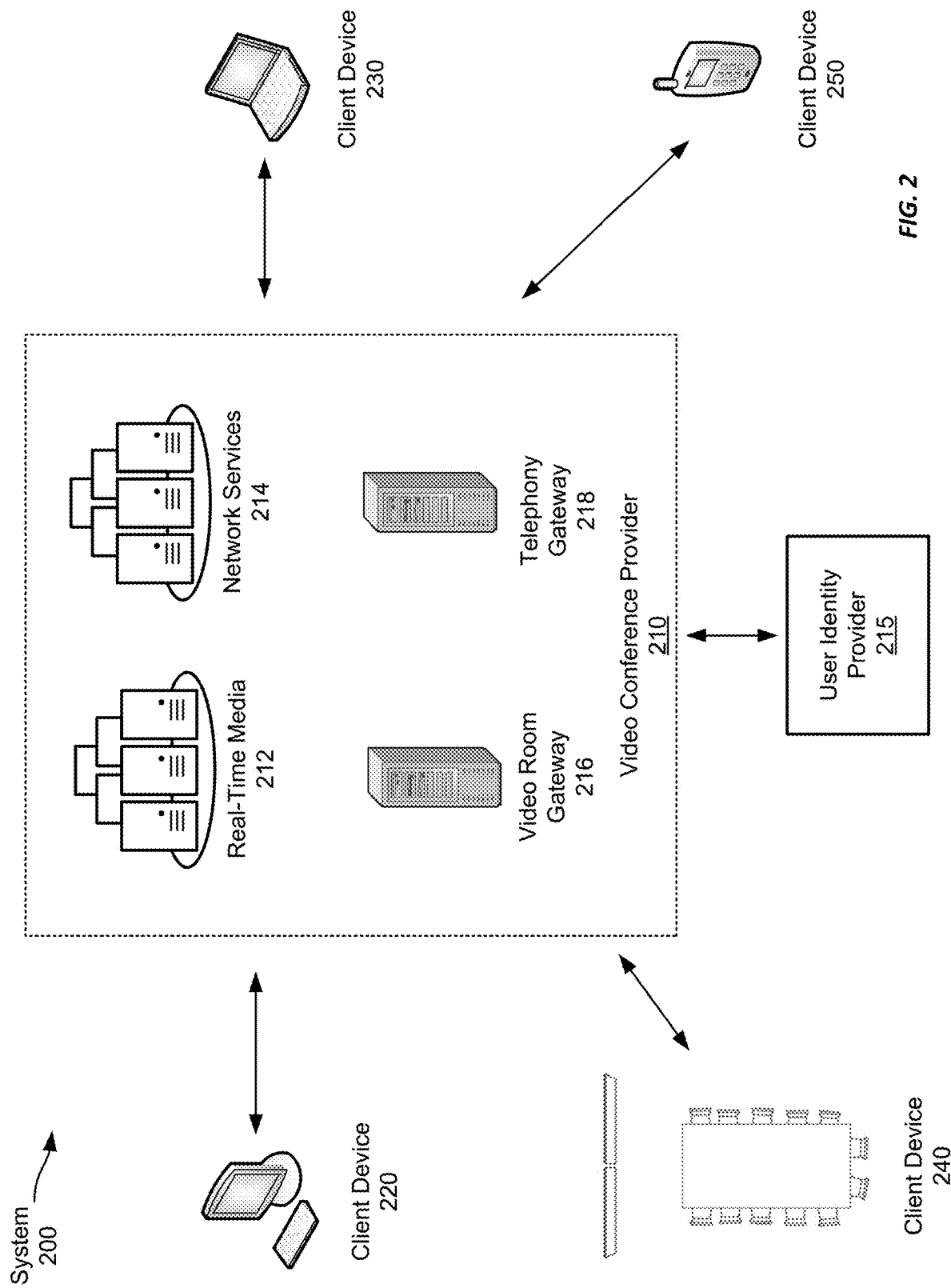
FIG. 2 shows an example system in which a video conference provider provides videoconferencing functionality to various client devices, according to certain aspects described herein.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that has audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including keypair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory, and network I/O) as well as network parameters such as packet loss, latency, and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia streams in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider 210, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples, additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information, etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosted by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
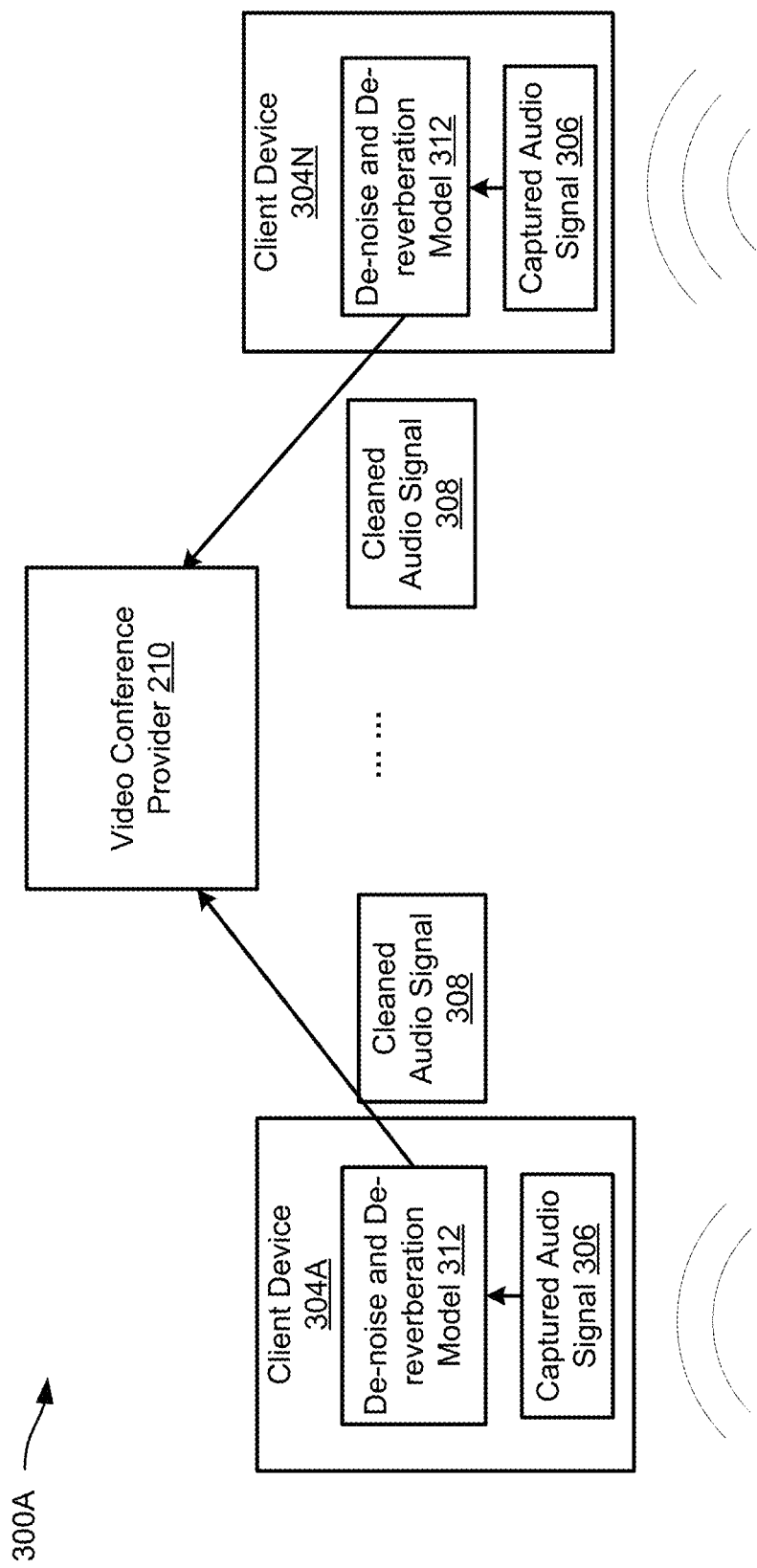
FIG. 3A shows an example of an operating environment for joint de-noise and de-reverberation of audio signals in videoconferences, according to certain aspects described herein.

Referring now to FIG. 3A, FIG. 3A shows an example of an operating environment 300A for joint de-noise and de-reverberation of audio signals for videoconferences, according to certain aspects described herein. The operating environment 300A includes the video conference provider 210 as described above with respect to FIGS. 1 and 2, and client devices 304A-304N associated with participants of the meeting. The client devices 304A-304N may be referred to herein individually as a client device 304 or collectively as the client devices 304. The client devices 304 may be any type of client device, such as those discussed above with respect to FIGS. 1 and 2.

As discussed above with respect to FIGS. 1 and 2, the video conference provider 210 is configured to provide video conference functionalities for the client devices 304. During the meeting, a client device 304 may capture an audio signal 306 in a physical environment where the client device 304 is located through an audio recording device, as such a microphone. The captured audio signal 306 may include the speech signal of the participant or other audio signal to be transmitted to the other participants. Depending on the location where a participant joins the meeting using the client device 304, the physical environment may be a room, an office, a car, an outdoor area, and so on.

When the audio signal 306 is being captured, different distortions may be introduced. One distortion is the noise that is captured along with the audio signal, which may be the background noise of the environment, noise generated by inadvertent operation of the participant near the audio recording device, or a defect of the audio recording device. Another distortion is the reverberation effect of the audio signal captured by the audio recording device. Reverberation is the persistence of a sound after the sound is produced. A reverberation is created when a sound or signal is reflected causing numerous reflections to build up and then decay as the sound is absorbed by the surfaces of objects in the space-which could include furniture, people, and air.

To remove the noise and reverberation from the captured audio signal 306, the client device 304 can employ a de-noise and de-reverberation model 312 that is configured to simultaneously remove the noise and reverberation from the captured audio signal 306. The de-noise and de-reverberation model 312 generates cleaned audio signal 308 which is sent by the client device 304 to other client devices associated with other participants of the meeting through video conference provider 210.

While FIG. 3A shows that the client devices 304 use the de-noise and de-reverberation model 312 to clean up the captured audio signal 306 before sending it to the video conference provider 210, other arrangements are also possible. For example, the video conference provider 210 can be configured with a de-noise and de-reverberation model, and each client device 304 can send the captured audio signal 306 to the video conference provider 210. The video conference provider 210 cleans up the received audio signals using the de-noise and de-reverberation model before sending the audio signals to other participant client devices. In another example, some client devices have de-noise and de-reverberation models installed and some do not. Those client devices that do not have the de-noise and de-reverberation model (e.g., a client device that has a lower version of the client application for the meeting) can send the captured audio signal 306 to the video conference provider 210 to clean up the audio signal. In this example, the data packets sent from a client device 304 to the video conference provider 210 can include a flag indicating whether the audio signal has been cleaned up or not. For the received audio signals that have not been cleaned up, the video conference provider 210 can use the de-noise and de-reverberation model to generate the cleaned audio signal before sending it to other participants. For audio signals that have already been cleaned up at the respective client devices, the video conference provider 210 can forward them to other participants as described above with respect to FIGS. 1 and 2.

Figure 3B:
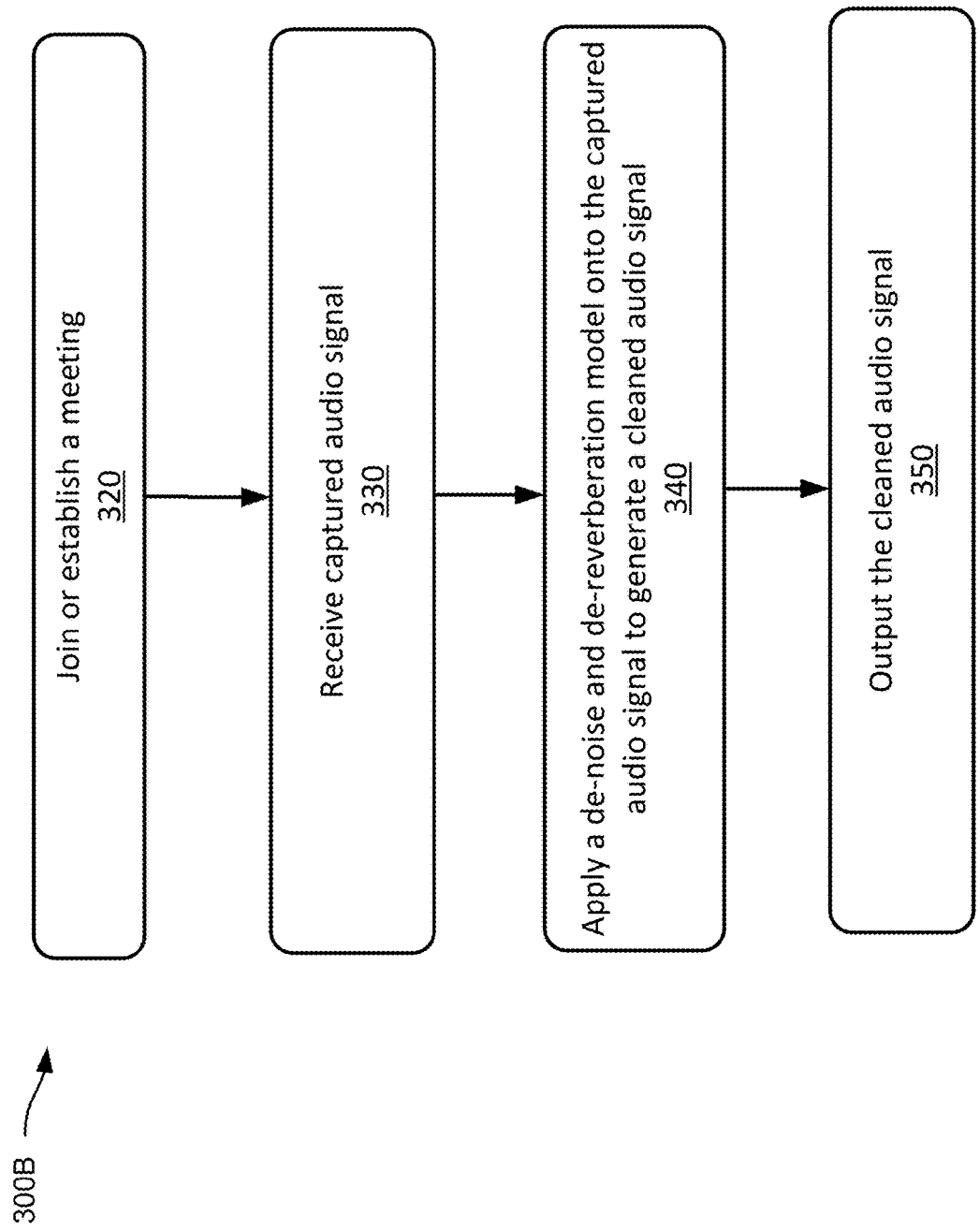
FIG. 3B shows an example of a flow chart that illustrates a process for generating a cleaned audio signal using a de-noise and de-reverberation model, according to certain aspects described herein.

FIG. 3B shows an example of a flow chart that illustrates a process 300B for generating a cleaned audio signal using a de-noise and de-reverberation model, according to certain aspects described herein. FIG. 3B will be described with respect to the system shown in FIG. 3. However, any suitable system according to this disclosure may be employed. The client device 304 can implement the operations in the process 300B to clean up the captured audio signal before sending it to the video conference provider 210. The video conference provider 210 can perform the process 300B to clean up the audio signal received from a client device that participates in the meeting and has not or does not have the capability to clean up the captured audio signal.

At block 320, the process 300B involves the client device 304 joining a meeting or the video conference provider 210 establish a meeting. At block 330, the process 300B involves receiving a captured audio signal that is recorded in a physical environment. The client device 304 receives the captured audio signal from an audio recording device, such as a microphone associated with the client device 304. The video conference provider 210 can receive the captured audio signal from a client device that has joined the meeting and has not cleaned the audio signal before transmitting it to the video conference provider 210.

At block 340, the process 300B involves the client device 304 or the video conference provider 210 applying a de-noise and de-reverberation model 312 onto the captured audio signal to generate a cleaned audio signal as discussed above with respect to FIG. 3A. Based on the configuration of the de-noise and de-reverberation model, the client device 304 or the video conference provider 210 can process the captured audio signal to transform it into a format that can be accepted by the de-noise and de-reverberation model. For example, the client device 304 or the video conference provider 210 can divide the captured audio signal into segments and apply a transformation on the segments to transform them into a frequency domain. Other processing may also be performed to prepare the captured audio signal for input to the de-noise and de-reverberation model. Similarly, the output of the de-noise and de-reverberation model may also be processed to generate the cleaned audio signal. For example, if the direct output of the de-noise and de-reverberation model is audio segments in the frequency domain, an inverse transform can be applied to the segments transform them back to the temporal domain. These inverse-transformed signals may be concatenated together to generate the cleaned audio signal.

At block 350, the process involves outputting the cleaned audio signal. For example, the client device 304 may transmit the cleaned audio signal to the video conference provider 210 for transmission to other participating client devices. Likewise, the video conference provider 210 may also transmit the cleaned audio signal to other participating client devices. In some examples, outputting may also involve playing the cleaned audio signal through an audio output device, such as the speaker, or sending the cleaned audio signal to a component configured to further process the cleaned audio signal to perform, for example, speech recognition or voice recognition.

The de-noise and de-reverberation model 312 may also be used in applications other than videoconferencing. In those applications, block 320 can be skipped and a computing device can employ block 330-350 to simultaneously remove noise and reverberation from a captured audio signal.

Figure 4:
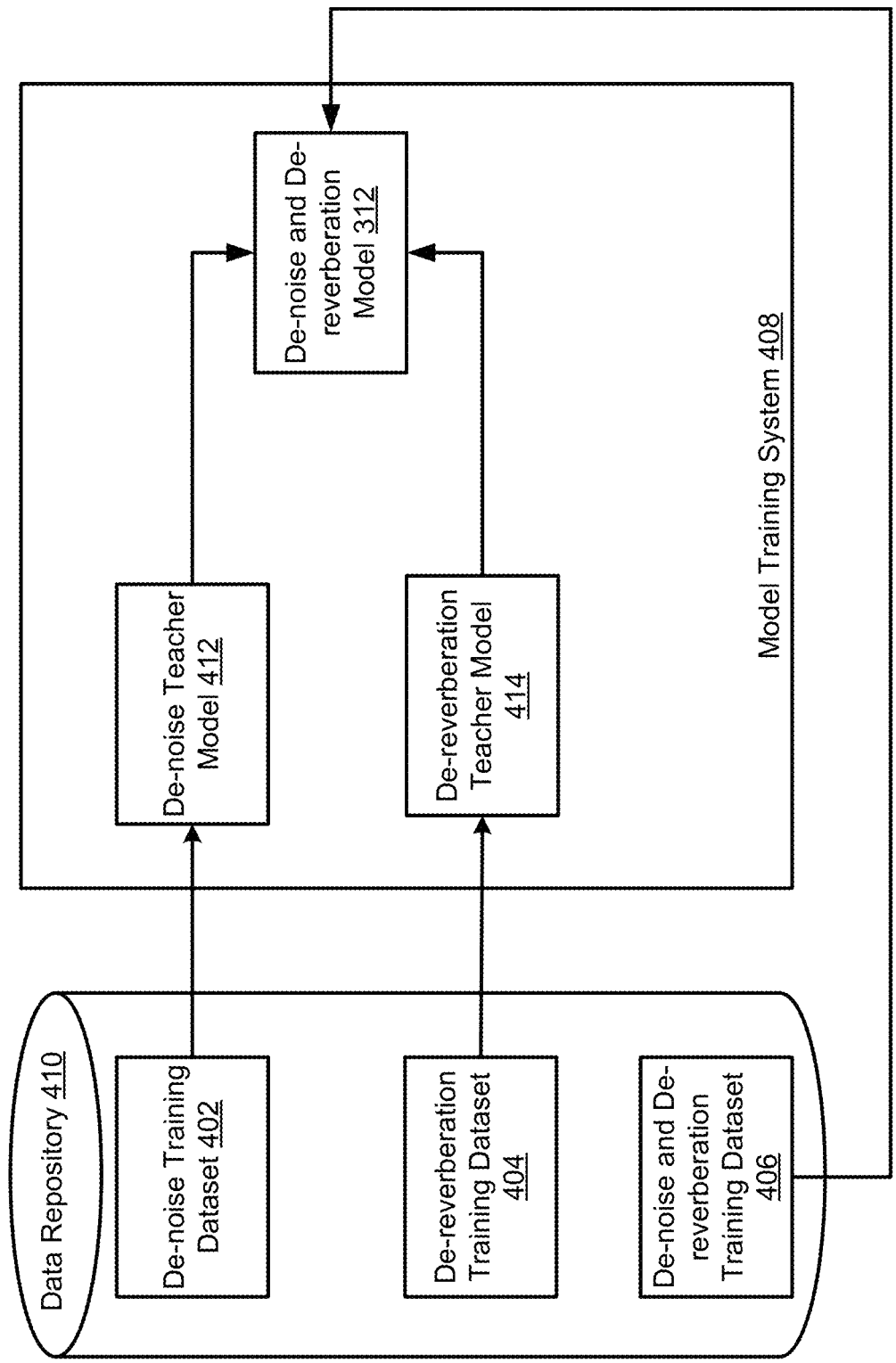
FIG. 4 shows an example of a system configured for building and training various models involved in the training of a de-noise and de-reverberation model, according to certain aspects described herein.

Referring now to FIG. 4, FIG. 4 shows an example of a system configured for building and training various models involved in the training of a de-noise and de-reverberation model, according to certain aspects described herein. As shown in FIG. 4, a model training system 408 is employed to build and train three models: a de-noise teacher model 412, a de-reverberation teacher model 414, and a de-noise and de-reverberation model 312. The de-noise teacher model 412 is configured to remove noise from input audio signals. The de-reverberation teacher model 414 is configured to remove reverberation from input audio signals. The de-noise and de-reverberation model 312 is configured to remove noise and reverberation simultaneously from the input audio signals. In some examples, the de-noise teacher model 412, the de-reverberation teacher model 414, and the de-noise and de-reverberation model 312 are regression models, such as neural network models.

Compared with the two teacher models, the de-noise and de-reverberation model 312 has a less complicated structure and thus requires fewer computations to operate. In the example where all three models are neural network models, the de-noise and de-reverberation model 312 can be configured with fewer layers and fewer nodes than each of the teacher models. For instance, the number of layers in the de-noise and de-reverberation model 312 can be 30%-60% of the number of layers in the de-noise teacher model 412 or the de-reverberation teacher model 414. The number of nodes in the de-noise and de-reverberation model 312 can be 20%-40% of the number of nodes in the de-noise teacher model 412 or the de-reverberation teacher model 414. By setting up the three models in this way, the de-noise teacher model 412 and the de-reverberation teacher model 414 can be configured to utilize their respective complex model structures to capture the relationship between the input audio signal and the output signal to efficiently clean up the input audio signals. As discussed below, these two teacher models can be used to guide the training of the less complex de-noise and de-reverberation model so that the de-noise and de-reverberation model can obtain an accurate output with a simpler model structure thereby requiring less computational complexity.

To train the de-noise and de-reverberation model, a model training system can train the two teacher models first. A training dataset is generated for each of the teacher models. For example, for the de-noise teacher model 412, a de-noise training dataset 402 containing noisy audio signals or samples can be generated. The noisy audio signals can be generated by adding noises of different types with different strengths to clean audio signals. For the de-reverberation teacher model 414, a de-reverberation training dataset 404 containing reverberated audio signals can be generated. The reverberated audio signals can be generated by adding reverberations of different types with different strengths to clean audio signals. In some examples, the de-noise training dataset 402, the de-reverberation training dataset 404, and the de-noise and de-reverberation training dataset 406 are stored in a data repository accessible to the model training system 408. The model training system 408 fully trains the de-noise teacher model 412 and the de-reverberation teacher model 414 using the de-noise training dataset 402 and the de-reverberation training dataset 404, respectively.

The training of the de-noise and de-reverberation model 312 includes two stages. In the first stage, values generated by the de-noise teacher model 412 and the de-reverberation teacher model 414 are utilized to guide the training of a portion of the parameters of the de-noise and de-reverberation model 312. In the example where the models are neural network models, the model training system 408 can retrieve the output values of a hidden layer from each of the two teacher models 412 and 414. The model training system 408 can further adjust the parameters of the de-noise and de-reverberation model 312 in the input layer and the hidden layers to minimize a loss function defined based on the hidden layer output values of the two teacher models 412 and 414.

The second stage of the training is performed independently of the two teacher models. In this stage, the parameters of the entire de-noise and de-reverberation model 312 are adjusted or updated to minimize a loss function defined based on the similarity between the cleaned audio signals generated by the de-noise and de-reverberation model 312 and the ground truth clean audio signal in the training dataset. The training dataset is the de-noise and de-reverberation training dataset 406 generated for the de-noise and de-reverberation model 312. The trained de-noise and de-reverberation model 312 can be provided to client devices of the videoconferencing system to simultaneously remove noise and reverberation from recorded audio signals as described above. Additional details about training the de-noise and de-reverberation model 312 are provided below with respect to FIGS. 5 and 6.

Figure 5:
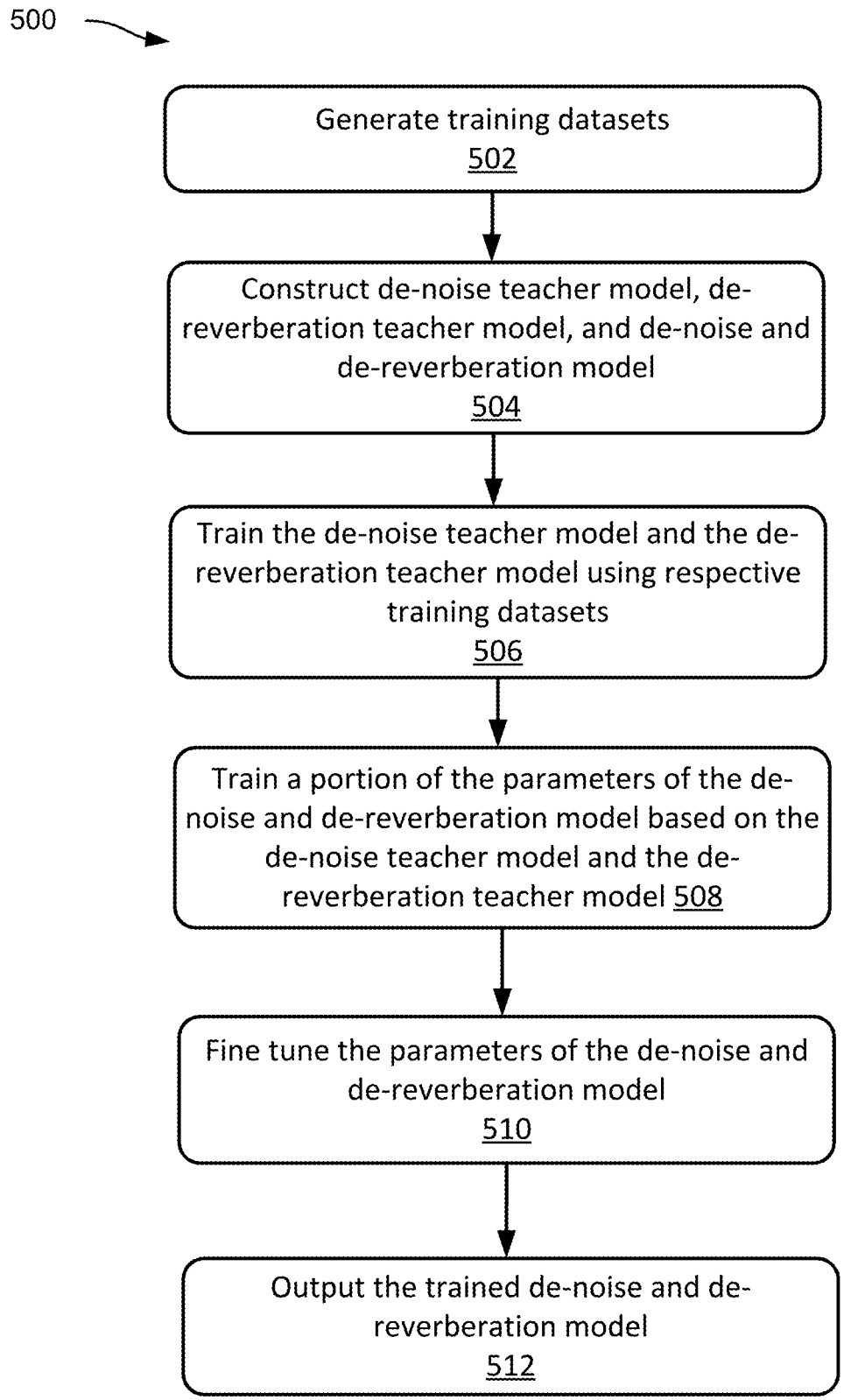
FIG. 5 shows an example of a flow chart that illustrates a process for training a de-noise and de-reverberation model, according to certain aspects described herein.

Referring now to FIG. 5, FIG. 5 includes a flow chart that illustrates a process 500 for training a de-noise and de-reverberation model, according to some aspects described herein. FIG. 5 will be described in conjunction with FIG. 6 which shows an example of the parameters of the models involved in the training of the de-noise and de-reverberation model. FIG. 5 will be described with respect to the system shown in FIG. 4. However, any suitable system according to this disclosure may be employed. The model training system 408 or another computing system can implement the operations in the process 500.

At block 502, the process 500 involves generating training datasets for the models involved in the training of the de-noise and de-reverberation model 312. The model training system 408 or another computing device can generate the de-noise training dataset 402, the de-reverberation training dataset 404, and the de-noise and de-reverberation training dataset 406 and store them in the data repository 410. To generate the de-noise training dataset 402, the model training system 408 or another computing device can access various noise signals that are simulated or recorded in real environments. These noises can be added to a clean audio signal to generate noisy audio signals as samples in the de-noise training dataset 402. In some examples, the strength of the noise can be changed to different values to generate noisy signals with different signal-to-noise ratios (SNRs). The clean audio signals can serve as the ground truth signals in the de-noise training dataset 402.

To generate the de-reverberation training dataset 404, the model training system 408 or another computing device can use a reverberation tool to simulate the reverberation according to various reverberation parameters. The reverberation parameters can include a pre-delay time that describes the collection of reflected sound from direct sound to 50 ms, a room-scale parameter describing the size of the space where the reverberation effect takes place, a volume of the reverberation which is related to the number of items in the room and the materials of the walls or items in the room, and other parameters. These reverberations generated by the tool can be added to a clean audio signal to generate reverberated audio signals as samples in the de-reverberation training dataset 404. Similar to the noisy audio signals, the strength of the reverberation can be changed to different values to generate reverberated signals with different reverberation parameters. The clean audio signals can serve as the ground truth signals in the de-reverberation training dataset 404.

The de-noise and de-reverberation training dataset 406 can be constructed by including a portion or all of samples from the de-noise training dataset 402 and a portion or all of samples from the de-reverberation training dataset 404. In some examples, the de-noise and de-reverberation training dataset 406 can also be constructed by adding recorded or simulated noises and reverberations to clean audio signals. In other words, a sample in the de-noise and de-reverberation training dataset 406 can be constructed by adding a noise component and a reverberation component to a clean audio signal and use the clean signal as the ground truth signals. The noise component and the reverberation component can be generated in a way similar to generating the noise for the de-noise training dataset 402 and the reverberation for the de-reverberation training dataset 404. In some examples, these two types of training datasets are both used in the training of the de-noise and de-reverberation model 312. For instance, the first type of training dataset is used during the first stage of training the de-noise and de-reverberation model 312 and the second type of training dataset is used in the second stage of training of the de-noise and de-reverberation model 312.

At block 504, the process 500 involves constructing the de-noise teacher model 412, the de-reverberation teacher model 414, and the de-noise and de-reverberation model 312. As discussed above with respect to FIG. 4, the de-noise teacher model 412 and the de-reverberation teacher model 414 can each be constructed to be a full-fledged model with a more complex model structure than the de-noise and de-reverberation model 312. The structures or scales of the de-noise teacher model 412 and the de-reverberation teacher model 414 may be the same or different.

At block 506, the process 500 involves training the de-noise teacher model 412 using the de-noise training dataset 402 and training the de-reverberation teacher model 414 using the de-reverberation training dataset 404. In the above examples where the models are neural network models, the de-noise teacher model 412 and the de-reverberation teacher model 414 can each be trained using the backpropagation algorithm. During the training, the input signal to each of the de-noise teacher model 412 and the de-reverberation teacher model 414 can be generated by dividing the input audio signals into segments and applying a transformation to each segment. The input signals to each of the models are thus transformed audio signals. The transformation can be a short-time Fourier transform (STFT). In some examples, The transformed signal may further be processed, such as by applying a log function, to obtain the final input signals to the model. The input to the de-noise and de-reverberation model 312 can be similarly constructed.

At block 506, the process 500 involves the first stage of training the de-noise and de-reverberation model 312. In the first stage, the model training system 408 determines a portion of the parameters of the de-noise and de-reverberation model 312 based on the trained de-noise teacher model 412 and the trained de-reverberation teacher model 414. In some examples, the model training system 408 can retrieve the output values of a hidden layer from each of the two teacher models and further adjust the parameters of the de-noise and de-reverberation model in the input layer and the hidden layers to minimize a loss function defined based on the output values of the two teacher models.

Figure 6:
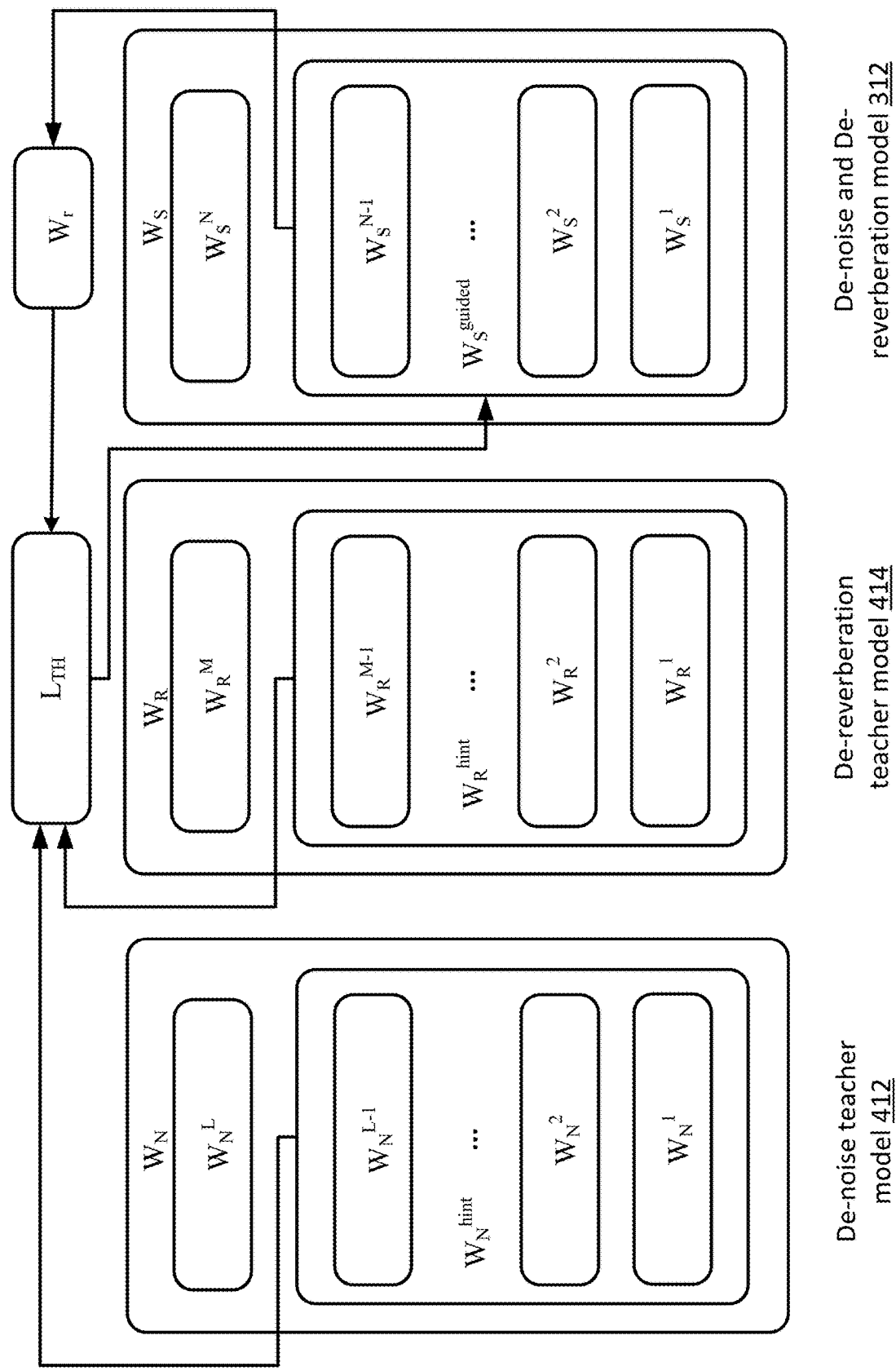
FIG. 6 shows an example of the parameters of the models involved in the training of the de-noise and de-reverberation model, according to certain aspects described herein.

FIG. 6 shows an example of the parameters of the models involved during the first stage training of the de-noise and de-reverberation model, according to certain aspects described herein. Assume that the de-noise teacher model 412 has L layers with the input layer as the first layer, the output layer as the L-th layer, and hidden layers being the second layer to the (L−1)-th layer. In this example, the output of the last hidden layer (i.e., layer L−1) of the de-noise teacher model 412 is used to guide the training of the de-noise and de-reverberation model, and thus the last hidden layer is referred to as a guided layer. The parameters (e.g., weights of connections between nodes) for the i-th layer of the de-noise teacher model 412 are denoted as $W_N^i$. The collection of the parameters of all the layers of the de-noise teacher model 412 is denoted by $W_N$. The parameters of the first L−1 layers (from the first layer up to the guided layer) are denoted as $W_N^{hint}$.

Similarly, assume that the de-reverberation teacher model 414 has M layers and the parameters of the model are denoted by $W_R$. The parameters (e.g., weights of connections between nodes) for the i-th layer of the de-reverberation teacher model 414 are denoted as $W_R^i$. The last hidden layer (i.e., (M−1)-th layer) is selected as the guided layer and the parameters of the first M−1 layers are denoted as $W_R^{hint}$. For the de-noise and de-reverberation model 312, assume the model has N layers, and the parameters (e.g., weights of connections between nodes) for the i-th layer of the de-noise and de-reverberation model 312 are denoted as $W_S^i$. The parameters of all the layers of the model are denoted by $W_S$. The parameters of the first N−1 layers are denoted as $W_S^{guided}$. As used herein, a hint refers to the output of a hidden layer in a teacher model responsible for guiding the learning process of the de-noise and de-reverberation model 312. In this example, the teacher model is the de-noise teacher model 412 or the de-reverberation teacher model 414.

In order to use the two teacher models to guide the training of the de-noise and de-reverberation model, the inputs to the three models are coordinated during the training of the de-noise and de-reverberation model 312. In one example, the first type of de-noise and de-reverberation training dataset 406 is used for the training. For example, the samples in the de-noise training dataset 402 are provided to the de-noise teacher model 412 and the de-noise and de-reverberation model 312 as input. The samples in the de-reverberation training dataset 404 are provided to the de-reverberation teacher model 414 and the de-noise and de-reverberation model 312 as input.

In this training stage, the training is performed by adjusting the parameters $W_S^{guided}$ of the de-noise and de-reverberation model 312 to minimize a loss function $\mathcal{L}_{HT}$ as follows:

$$W_S^{guided*} = \arg\min_{W_S^{guided}} \mathcal{L}_{HT}(W_S^{guided}, W_r) \qquad (1)$$

$$\mathcal{L}_{TH}(W_S^{guided}, W_r) = \qquad (2)$$
$$\frac{1}{2}\|C((u_N^{hint}(x_N; W_N^{hint}) - r(u_S^{guided}(x_N; W_S^{guided}); W_r)),$$
$$(u_R^{hint}(x_R; W_R^{hint}) - r(u_S^{guided}(x_R; W_S^{guided}); W_r)))\|^2.$$

Here, $x_N$ and $x_R$ are input signals to the de-noise teacher model 412 and the de-reverberation teacher model 414, respectively. The input signal $x_N$ and $x_R$ can be the transformed and processed audio signal as discussed above. C is a function that combines the outputs of the hint layers of the two teacher models. The function may be addition, weighted average, or other functions. $u_N^{hint}( )$ and $u_R^{hint}( )$ are the deep-nested functions of the teacher models up to their respective hint layers with parameters $W_N^{hint}$ and $W_R^{hint}$. $u_S^{guided}( )$ is the deep-nested function of the de-noise and de-reverberation model up to the guided layer with parameters $W_S^{guided}$. $r( )$ is a regression function added on top of the guided layer of the de-noise and de-reverberation model with parameters $W_r$. The $r( )$ function is used to increase the dimension of the output of the last hidden layer of the de-noise and de-reverberation model so that the output dimension matches that of the two teacher models. The parameters $W_r$ are also trainable parameters.

Referring back to FIG. 5, at block 510, the process 500 involves the second stage of the training of the de-noise and de-reverberation model 312, that is, fine-tuning the parameters of the de-noise and de-reverberation model. In one example, the parameters to be fine-tuned or adjusted are parameters of all the layers of the de-noise and de-reverberation model 312, i.e., $W_S$ in the example shown in FIG. 6. This fine-tuning stage can be performed by changing $W_S$ to minimize a second stage loss function as follows:

$$W_S^* = \arg\min_{W_S} \mathcal{L}(W_S). \qquad (3)$$

The loss function $\mathcal{L}$ can be a loss function measuring the difference between the output signal of the de-noise and de-reverberation model 312 and the ground truth signal, such as the $L_2$ loss or a cosine similarity loss defined as:

$$\text{cosine\_similarity\_loss} = -\frac{s \cdot t}{\|s\|\,\|t\|} \qquad (4)$$

Here, s and t represent the output of the model and the ground truth signal, respectively. The training samples used for the second-stage training can include the samples in the second type of de-noise and de-reverberation training dataset 406 as discussed above.

At block 512, the process 500 involves outputting the trained de-noise and de-reverberation model 312. As discussed above with respect to FIG. 3, the trained de-noise and de-reverberation model can be installed on client devices 304 or the video conference provider 210 to clean up the captured audio signal before sending it to other participants of a meeting. In other examples, the trained de-noise and de-reverberation model can be used for other purposes, such as to clean up the audio signal for speech recognition, voice recognition, or playing through an audio output device like a speaker.

It should be understood that the operations shown in the process 500 illustrated in FIG. 5 are for illustration purposes only and should not be construed as limiting. More or fewer operations may be performed to train the de-noise and de-reverberation model.

While the above description focuses on a de-noise and de-reverberation model for removing noise and reverberation simultaneously, the same techniques can be utilized to generate and train a model for purposes other than noise and reverberation removal or purposes other than audio signal processing. For example, the same techniques can be utilized to generate a model for image processing, video processing, natural language processing, or any tasks that have two goals to be achieved at the same time.

In addition, the techniques can also be used to simultaneously achieve more than two goals. For example, a model can be built by employing more than two teacher models with each of the teacher models configured to achieve one or more of the multiple goals. A hidden layer output from each of the teacher models can be used to guide the training of the model in a way similar to those described above. The same techniques can also be utilized to generate and train a model using a single teacher model. The model can have any type of output, including continuous signal output such as the audio signal output presented herein. The single teacher model can be utilized to guide the first stage training of the model so that a less complicated model can be built with similar performance to the teacher model.

Figure 7:
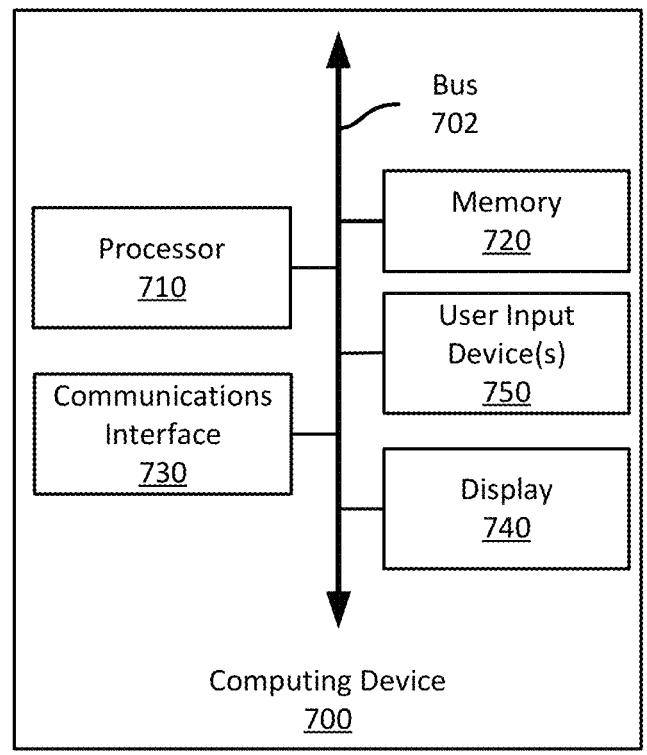
FIG. 7 shows an example computing device suitable for implementing aspects of the techniques and technologies described herein.

Referring now to FIG. 7, FIG. 7 shows an example computing device 700 suitable for implementing aspects of the techniques and technologies described herein. The example computing device 700 includes a processor 710 which is in communication with the memory 720 and other components of the computing device 700 using one or more communications buses 702. The processor 710 is configured to execute processor-executable instructions stored in the memory 720 to execute the model training system 408 or a portion thereof according to this disclosure or to perform one or more methods for training the de-noise and de-reverberation model according to different examples, such as part or all of the example process 500 described above with respect to FIG. 5. The computing device, in this example, also includes one or more user input devices 750, such as a keyboard, mouse, touchscreen, video capture device, microphone, etc., to accept user input. The computing device 700 also includes a display 740 to provide visual output to a user.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Various examples are described for systems and methods for joint de-noise and de-reverberation of audio signals for videoconferences.

Clause 1: A computer-implemented method in which one or more processing devices perform operations comprising: receiving an audio signal recorded in a physical environment; applying a de-noise and de-reverberation model onto the audio signal to generate a cleaned audio signal, wherein the de-noise and de-reverberation model is configured to remove noise and reverberation from the audio signal and is trained via a training process comprising: generating a plurality of training datasets that comprise a first training dataset for a de-noise teacher model, a second training dataset for a de-reverberation teacher model, and a third training dataset for the de-noise and de-reverberation model; constructing the de-noise teacher model, the de-reverberation teacher model, and the de-noise and de-reverberation model; training the de-noise teacher model and the de-reverberation teacher model using the first training dataset and the second training dataset, respectively; training the de-noise and de-reverberation model by at least: adjusting a portion of parameters of the de-noise and de-reverberation model using the third training dataset and based on values generated by the de-noise teacher model and the de-reverberation teacher model; and adjusting the parameters of the de-noise and de-reverberation model independently of the de-noise teacher model and the de-reverberation teacher model; and outputting the cleaned audio signal.

Clause 2: The method of clause 1, wherein each of the de-noise teacher model, the de-reverberation teacher model, and the de-noise and de-reverberation model is a neural network model, and each of the de-noise teacher model and the de-reverberation teacher model has a larger number of layers and a larger number of nodes than the de-noise and de-reverberation model.

Clause 3: The method of clause 1 or 2, wherein: the first training dataset is generated by adding noise signals to a clean audio signal; the second training dataset is generated by adding reverberation signals to the clean audio signal; and the third training dataset comprises at least a portion of the first training dataset and at least a portion of the second training dataset.

Clause 4: The method of any of clauses 1-3, wherein the third training dataset is generated by adding reverberation signals and noise signals to the clean audio signal.

Clause 5: The method of any of clauses 1-4, wherein each of the de-noise teacher model, the de-reverberation teacher model, and the de-noise and de-reverberation model is a neural network model, and wherein adjusting a portion of parameters of the de-noise and de-reverberation model comprises: accessing a first output of a first hidden layer of the de-noise teacher model; accessing a second output of a second hidden layer of the de-reverberation teacher model; transforming a third output of a third hidden layer of the de-noise and de-reverberation model to match a dimension of the first output and the second output; and adjusting the portion of parameters of the de-noise and de-reverberation model by minimizing a loss function calculated based on the first output, second output, and the transformed third output, the portion of parameters comprising weights for an input layer and hidden layers below the third hidden layer of the de-noise and de-reverberation model.

Clause 6: The method of any of clauses 1-5, wherein adjusting the parameters of the de-noise and de-reverberation model comprises minimizing a loss function defined based on cleaned audio signals generated by the de-noise and de-reverberation model for samples contained in the third training dataset and ground truth clean signals in the third training dataset.

Clause 7: The method of any of clauses 1-6, wherein the one or more processing devices comprise at least one of a client device or a video conference provider.

Clause 8: The method of any of clauses 1-7, wherein outputting the cleaned audio signal comprises one or more of: transmitting the cleaned audio signal to a remote device; playing the cleaned audio signal through an audio output device; or sending the cleaned audio signal to a component configured to further process the cleaned audio signal.

Clause 9: A non-transitory computer-readable media communicatively coupled to one or more processors and storing processor-executable instructions that, when executed by the one or more processors, cause the one or more processors to perform operations comprising: receiving an audio signal recorded in a physical environment; applying a de-noise and de-reverberation model onto the audio signal to generate a cleaned audio signal, wherein the de-noise and de-reverberation model is configured to remove noise and reverberation from the audio signal and is trained via a training process comprising: generating a plurality of training datasets that comprise a first training dataset for a de-noise teacher model, a second training dataset for a de-reverberation teacher model, and a third training dataset for the de-noise and de-reverberation model; constructing the de-noise teacher model, the de-reverberation teacher model, and the de-noise and de-reverberation model; training the de-noise teacher model and the de-reverberation teacher model using the first training dataset and the second training dataset, respectively; training the de-noise and de-reverberation model by at least: adjusting a portion of parameters of the de-noise and de-reverberation model using the third training dataset and based on values generated by the de-noise teacher model and the de-reverberation teacher model; and adjusting the parameters of the de-noise and de-reverberation model independently of the de-noise teacher model and the de-reverberation teacher model; and outputting the cleaned audio signal.

Clause 10: The non-transitory computer-readable media of clause 9, wherein each of the de-noise teacher model, the de-reverberation teacher model, and the de-noise and de-reverberation model is a neural network model, and each of the de-noise teacher model and the de-reverberation teacher model has a larger number of layers and a larger number of nodes than the de-noise and de-reverberation model.

Clause 11: The non-transitory computer-readable media of clause 9 or clause 10, wherein: a sample in the first training dataset is a noisy audio signal comprising a noise component and a clean audio signal; a sample in the second training dataset is a reverberated audio signal comprising a reverberation component and a clean audio signal; and a sample in the third training dataset comprises a noise component, a reverberation component and a clean audio signal.

Clause 12: The non-transitory computer-readable media of any of clauses 9-11, wherein the third training dataset comprises a portion of the first training dataset and a portion of the second training dataset.

Clause 13: The non-transitory computer-readable media of any of clauses 9-12, wherein each of the de-noise teacher model, the de-reverberation teacher model, and the de-noise and de-reverberation model is a neural network model, and wherein adjusting a portion of parameters of the de-noise and de-reverberation model comprises: accessing a first output of a first hidden layer of the de-noise teacher model; accessing a second output of a second hidden layer of the de-reverberation teacher model; transforming a third output of a third hidden layer of the de-noise and de-reverberation model; and adjusting the portion of parameters of the de-noise and de-reverberation model to minimize a loss function calculated based on the first output, second output, and the transformed third output, the portion of parameters comprising weights for an input layer and hidden layers below the third hidden layer of the de-noise and de-reverberation model.

Clause 14: The non-transitory computer-readable media of any of clauses 9-13, wherein adjusting the parameters of the de-noise and de-reverberation model comprises minimizing a loss function defined based on cleaned audio signals generated by the de-noise and de-reverberation model for samples contained in the third training dataset and ground truth clean signals in the third training dataset.

Clause 15: The non-transitory computer-readable media of any of clauses 9-14, wherein outputting the cleaned audio signal comprises one or more of: transmitting the cleaned audio signal to a remote device; playing the cleaned audio signal through an audio output device; or sending the cleaned audio signal to a component configured to further process the cleaned audio signal.

Clause 16: A system comprising: a processor; and a memory device including instructions that are executable by the processor to cause the processor to perform operations comprising: receiving an audio signal recorded in a physical environment; applying a de-noise and de-reverberation model onto the audio signal to generate a cleaned audio signal, wherein the de-noise and de-reverberation model is configured to remove noise and reverberation from the audio signal and is trained via a training process comprising: generating a plurality of training datasets that comprise a first training dataset for a de-noise teacher model, a second training dataset for a de-reverberation teacher model, and a third training dataset for the de-noise and de-reverberation model; constructing the de-noise teacher model, the de-reverberation teacher model, and the de-noise and de-reverberation model; training the de-noise teacher model and the de-reverberation teacher model using the first training dataset and the second training dataset, respectively; training the de-noise and de-reverberation model by at least: adjusting a portion of parameters of the de-noise and de-reverberation model using the third training dataset and based on values generated by the de-noise teacher model and the de-reverberation teacher model; and adjusting the parameters of the de-noise and de-reverberation model independently of the de-noise teacher model and the de-reverberation teacher model; and outputting the cleaned audio signal.

Clause 17: The system of clause 16, wherein each of the de-noise teacher model, the de-reverberation teacher model, and the de-noise and de-reverberation model is a neural network model, and each of the de-noise teacher model and the de-reverberation teacher model has a larger number of layers and a larger number of nodes than the de-noise and de-reverberation model.

Clause 18: The system of clause 16 or clause 17, wherein each of the de-noise teacher model, the de-reverberation teacher model, and the de-noise and de-reverberation model is a neural network model, and wherein adjusting a portion of parameters of the de-noise and de-reverberation model comprises: accessing a first output of a first hidden layer of the de-noise teacher model; accessing a second output of a second hidden layer of the de-reverberation teacher model; transforming a third output of a third hidden layer of the de-noise and de-reverberation model to match a dimension of the first output and the second output; and adjusting the portion of parameters of the de-noise and de-reverberation model by minimizing a loss function calculated based on the first output, second output, and the transformed third output, the portion of parameters comprising weights for an input layer and hidden layers below the third hidden layer of the de-noise and de-reverberation model.

Clause 19: The system of any of clauses 16-18, wherein adjusting the parameters of the de-noise and de-reverberation model comprises minimizing a loss function defined based on cleaned audio signals generated by the de-noise and de-reverberation model for samples contained in the third training dataset and ground truth clean signals in the third training dataset.

Clause 20: The system of any of clauses 16-19, wherein outputting the cleaned audio signal comprises one or more of: transmitting the cleaned audio signal to a remote device; playing the cleaned audio signal through an audio output device; or sending the cleaned audio signal to a component configured to further process the cleaned audio signal.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A computer-implemented method comprising:
   applying a de-noise and de-reverberation model onto an audio signal to generate a cleaned audio signal, wherein the de-noise and de-reverberation model is configured to remove noise and reverberation from the audio signal and is trained via a training process comprising:
   accessing a de-noise teacher model trained using a first training dataset and a de-reverberation teacher model trained using a second training dataset;
   training the de-noise and de-reverberation model by at least:
   adjusting a portion of parameters of the de-noise and de-reverberation model using a third training dataset and based on values generated by the de-noise teacher model and the de-reverberation teacher model, and
   adjusting the parameters of the de-noise and de-reverberation model independently of the de-noise teacher model and the de-reverberation teacher model; and
   outputting the cleaned audio signal.

2. The method of claim 1, wherein each of the de-noise teacher model, the de-reverberation teacher model, and the de-noise and de-reverberation model is a neural network model, and each of the de-noise teacher model and the de-reverberation teacher model has a larger number of layers and a larger number of nodes than the de-noise and de-reverberation model.

3. The method of claim 1, wherein:
   the first training dataset is generated by adding noise signals to a clean audio signal;
   the second training dataset is generated by adding reverberation signals to the clean audio signal; and
   the third training dataset comprises at least a portion of the first training dataset and at least a portion of the second training dataset.

4. The method of claim 1, wherein the third training dataset is generated by adding reverberation signals and noise signals to the clean audio signal.

5. The method of claim 1, wherein each of the de-noise teacher model, the de-reverberation teacher model, and the de-noise and de-reverberation model is a neural network model, and wherein adjusting a portion of parameters of the de-noise and de-reverberation model comprises:
   accessing a first output of a first hidden layer of the de-noise teacher model;
   accessing a second output of a second hidden layer of the de-reverberation teacher model;
   transforming a third output of a third hidden layer of the de-noise and de-reverberation model to match a dimension of the first output and the second output; and
   adjusting the portion of parameters of the de-noise and de-reverberation model by minimizing a loss function calculated based on the first output, second output, and the transformed third output, the portion of parameters comprising weights for an input layer and hidden layers below the third hidden layer of the de-noise and de-reverberation model.

6. The method of claim 1, wherein adjusting the parameters of the de-noise and de-reverberation model comprises minimizing a loss function defined based on cleaned audio signals generated by the de-noise and de-reverberation model for samples contained in the third training dataset and ground truth clean signals in the third training dataset.

7. The method of claim 1, wherein outputting the cleaned audio signal comprises one or more of:
   transmitting the cleaned audio signal to a remote device;
   playing the cleaned audio signal through an audio output device; or
   sending the cleaned audio signal to a component configured to further process the cleaned audio signal.

8. A non-transitory computer-readable media comprising processor-executable instructions configured to cause one or more processors to:
   apply a de-noise and de-reverberation model onto an audio signal to generate a cleaned audio signal, wherein the de-noise and de-reverberation model is configured to remove noise and reverberation from the audio signal and is trained via a training process comprising:
   accessing a de-noise teacher model trained using a first training dataset and a de-reverberation teacher model trained using a second training dataset;
   training the de-noise and de-reverberation model by at least:
   adjusting a portion of parameters of the de-noise and de-reverberation model using a third training dataset and based on values generated by the de-noise teacher model and the de-reverberation teacher model; and adjusting the parameters of the de-noise and de-reverberation model independently of the de-noise teacher model and the de-reverberation teacher model; and output the cleaned audio signal.

9. The non-transitory computer-readable media of claim 8, wherein each of the de-noise teacher model, the de-reverberation teacher model, and the de-noise and de-reverberation model is a neural network model, and each of the de-noise teacher model and the de-reverberation teacher model has a larger number of layers and a larger number of nodes than the de-noise and de-reverberation model.

10. The non-transitory computer-readable media of claim 8, wherein:
a sample in the first training dataset is a noisy audio signal comprising a noise component and a clean audio signal;
a sample in the second training dataset is a reverberated audio signal comprising a reverberation component and a clean audio signal; and
a sample in the third training dataset comprises a noise component, a reverberation component and a clean audio signal.

11. The non-transitory computer-readable media of claim 8, wherein the third training dataset comprises a portion of the first training dataset and a portion of the second training dataset.

12. The non-transitory computer-readable media of claim 8, wherein each of the de-noise teacher model, the de-reverberation teacher model, and the de-noise and de-reverberation model is a neural network model, and wherein adjusting a portion of parameters of the de-noise and de-reverberation model comprises:
accessing a first output of a first hidden layer of the de-noise teacher model;
accessing a second output of a second hidden layer of the de-reverberation teacher model;
transforming a third output of a third hidden layer of the de-noise and de-reverberation model; and
adjusting the portion of parameters of the de-noise and de-reverberation model to minimize a loss function calculated based on the first output, second output, and the transformed third output, the portion of parameters comprising weights for an input layer and hidden layers below the third hidden layer of the de-noise and de-reverberation model.

13. The non-transitory computer-readable media of claim 8, wherein adjusting the parameters of the de-noise and de-reverberation model comprises minimizing a loss function defined based on cleaned audio signals generated by the de-noise and de-reverberation model for samples contained in the third training dataset and ground truth clean signals in the third training dataset.

14. The non-transitory computer-readable media of claim 8, further comprising processor-executable instructions configured to cause the one or more processors to:
transmit the cleaned audio signal to a remote device;
play the cleaned audio signal through an audio output device; or
send the cleaned audio signal to a component configured to further process the cleaned audio signal.

15. A system comprising:
a memory device; and
one or more processors communicatively coupled to the memory device, the one or more processors configured to execute processor-executable instructions stored in the memory device and configured to cause the one or more processors to:
apply a de-noise and de-reverberation model onto an audio signal to generate a cleaned audio signal, wherein the de-noise and de-reverberation model is configured to remove noise and reverberation from the audio signal and is trained via a training process comprising:
accessing a de-noise teacher model trained using a first training dataset and a de-reverberation teacher model trained using a second training dataset;
training the de-noise and de-reverberation model by at least:
adjusting a portion of parameters of the de-noise and de-reverberation model using a third training dataset and based on values generated by the de-noise teacher model and the de-reverberation teacher model, and
adjusting the parameters of the de-noise and de-reverberation model independently of the de-noise teacher model and the de-reverberation teacher model; and
output the cleaned audio signal.

16. The system of claim 15, wherein each of the de-noise teacher model, the de-reverberation teacher model, and the de-noise and de-reverberation model is a neural network model, and each of the de-noise teacher model and the de-reverberation teacher model has a larger number of layers and a larger number of nodes than the de-noise and de-reverberation model.

17. The system of claim 15, wherein each of the de-noise teacher model, the de-reverberation teacher model, and the de-noise and de-reverberation model is a neural network model, and wherein adjusting a portion of parameters of the de-noise and de-reverberation model comprises:
accessing a first output of a first hidden layer of the de-noise teacher model;
accessing a second output of a second hidden layer of the de-reverberation teacher model;
transforming a third output of a third hidden layer of the de-noise and de-reverberation model to match a dimension of the first output and the second output; and
adjusting the portion of parameters of the de-noise and de-reverberation model by minimizing a loss function calculated based on the first output, second output, and the transformed third output, the portion of parameters comprising weights for an input layer and hidden layers below the third hidden layer of the de-noise and de-reverberation model.

18. The system of claim 15, wherein adjusting the parameters of the de-noise and de-reverberation model comprises minimizing a loss function defined based on cleaned audio signals generated by the de-noise and de-reverberation model for samples contained in the third training dataset and ground truth clean signals in the third training dataset.

19. The system of claim 15, wherein the one or more processors are configured to execute further processor-executable instructions stored in the memory device to:
transmit the cleaned audio signal to a remote device;
play the cleaned audio signal through an audio output device; or
send the cleaned audio signal to a component configured to further process the cleaned audio signal.

\* \* \* \* \*